United States Patent [19]
Katoh

[11] Patent Number: 5,362,142
[45] Date of Patent: Nov. 8, 1994

[54] COMBINATION LINKAGE TYPE RUBBER CRAWLER
[75] Inventor: Yusaku Katoh, Fukuyama, Japan
[73] Assignee: Fukuyama Gomu Kogyo Kabushiki Gaisha, Hiroshima, Japan
[21] Appl. No.: 937,861
[22] PCT Filed: Apr. 15, 1991
[86] PCT No.: PCT/JP91/00494
  § 371 Date: Oct. 16, 1992
  § 102(e) Date: Oct. 16, 1992
[87] PCT Pub. No.: WO91/16230
  PCT Pub. Date: Oct. 31, 1991
[30] Foreign Application Priority Data
  Apr. 17, 1990 [JP] Japan .................. 2-101900
[51] Int. Cl.$^5$ ............................. B62D 55/24
[52] U.S. Cl. .................. 305/38; 305/35 EB; 305/56
[58] Field of Search ........... 305/35 R, 35 EB, 38, 305/39

[56] References Cited
U.S. PATENT DOCUMENTS
3,649,085  3/1972  Comellas ................... 305/38
4,241,956  12/1980  Meisel, Jr. ................ 305/38 X FOREIGN PATENT DOCUMENTS
3101780  11/1982  Germany ..................... 305/39
3922923  3/1990  Germany ..................... 305/35 R
0070687  3/1991  Japan ..................... 305/35 EB
4002582  1/1992  Japan ..................... 305/38
4292273  10/1992  Japan ..................... 305/35 R Primary Examiner—Russell D. Stormer
Attorney, Agent, or Firm—Lane, Aitken & McCann

[57] ABSTRACT

In a connected link type rubber crawler for use in a mobile construction machine, track links are connected on the inner periphery of the main body of a crawler made of rubber to form a continuous wheel turning track, and the main body of the crawler and the track links are easily and rigidly connected to each other. In order to connect the track link to the main body of the crawler, a pin is inserted through a hollow hole in an embedded member embedded and fixed in the main body of the crawler, and through a pin hole in the track link and locked against dislodging. The pin is directly embedded and fixed in the main body of the crawler, or the track link is fixed to an embedded member through bolting.

16 Claims, 14 Drawing Sheets

COMBINATION LINKAGE TYPE RUBBER CRAWLER

FIELD OF THE ART

The present invention relates to a rubber crawler to be mounted in a transportable type construction machine, etc., especially a preferable combination linkage type rubber crawler which is mounted in a vehicle of such a type as both steel crawler and rubber crawler are concurrently used.

BACKGROUND OF THE INVENTION

Mainly, steel crawlers have conventionally been utilized as crawler mounted in transportable type construction machines, etc. Rubber shoes have been used in some of the steel crawlers. Recently, rubber crawlers are preferably utilized.

FIG. 1 is a sectional view showing an example of conventional steel crawlers; 11 is an outer flanged rolling wheel, 12 is a steel crawler shoe, 12a is a shoe plate, 12b is a shoe link, 12c is a linkage pin, and 12d is a lug (steel made).

FIG. 2 is a sectional view showing an example of rubber shoe; 13 is a rubber shoe, 13a is a shoe plate, 13b is a shoe link, 13c is a linkage pin, and 13d is a rubber lug.

FIG. 3 is a sectional view showing a conventional rubber crawler; 14 is a rubber crawler, 14c is a lug, 15 is a core member, and 16 is a steel cord.

In FIGS. 1 through 3, the same outer flanged rolling wheel can be concurrently used as rolling wheel in any case.

Hence, steel crawlers have the following advantages;

(1) its vibration is small because a continuous rolling track is obtained by combination of the track link at the inner circumference, (2) Crawler come-off is scarce because there is no elongation nor phase error in the circumferential and width directions, and (3) the durability is good because mechanical combination of respective links, etc. is large, On the contrary, the steel crawlers inherently have the following disadvantages;

(1) Noise level is high, (2) Cushioning is not good, and an operator is subjected to a great deal of fatigue, and (3) Road surface is much damaged.

However, rubber crawlers have such advantages as mentioned below;

(1) Noise level is low, (2) Cushioning property is good, and fatigue of an operator is low, (3) Road surface is not damaged, and (4) The weight is comparatively light, and the running speed can be made comparatively high according thereto and in line with the above properties.

But, the rubber crawlers have the following shortcomings;

(1) Core members which project on the inner circumference at every fixed interval are provided and utilized as rolling track. Accordingly, rolling wheels are likely to drop between the fore and back projections, thereby causing the vibration to be made somewhat large, (2) Owing to that steel cords as elongation resisting member are buried slightly wave-like, and a thin rubber layer intervenes in the intermediate portion in the piled up area at both the ends of these steel cords, the crawler may be elongated when a remarkably high elongating force is given in the circumferential direction or the crawler itself may be distorted between the core members when an external force is given in the lateral width direction or come off due to those causes, and (3) The mechanical strength of rubber crawlers is based upon rubber substance, and adhering force between core members and steel cords, and it is influenced upon the adhering force at the boundary between metal and rubber. The mechanical strength is much inferior to that of the steel crawler. Accordingly, the durability of rubber crawler is inferior to that of steel crawler.

From such circumstances, rubber shoe composed so that rubber lug is provided at the grounding side of shoe plate of the steel crawler has been partially utilized. The rubber shoe. As for the rubber shoe, it is made so that a shoe plate and non-vulcanized rubber are arranged in position in a metal mold and are press-vulcanized, and a rubber lug is adhered to the surface of the shoe plate at the same time as that of the vulcanizing molding.

However, in such a rubber shoe, (1) The adhering point between shoe plate and rubber lug will be the weakest point in the composition of steel crawlers, (2) As the rubber shoe will be composed that it is compressed between the shoe plate as steel structure and the ground and will have no space of escape, damage of the rubber lug will be promoted, (3) As the shoe plate is considerably spaced toward the outer circumference to a linkage pin at a part where the shoe plate is wound and turned over, the interval between the fore and back shoe plates will be opened. For that reason, it is impossible to continue the rubber lug across the interval of shoe plates, and soil and mud may enter between shoe plates on weak road surface to cause a shortage of floating. In order to improve this, if the width of shoe plate is increased to reduce the ground-contacting pressure, the total weight may be also increased, instead, its bouyancy is lowered and it will be a change for the worse.

(4) Method for press-vulcanizing individual shoe plates by metal mold will bring remarkable cost-up.

As a result, such an improved rubber crawler will not be what is superior to mere rubber crawlers.

DISCLOSURE OF THE INVENTION

The present invention aims at solving the above shortcomings, that is, defects of rubber crawlers are going to be solved with advantages of steel crawlers.

COMPOSITION OF THE FIRST INVENTION

Firstly, the first invention is characterized in that as mentioned in claim 1, a pin is fitted and inserted in a pin hole which lies fore and back of respective track links opposed to each other, in a rubber crawler having a pair of track link which is continuous in the circumferential direction at the inner circumferential side of the crawler body, and both the side ends of the pins are buried in the crawler body.

According to the invention, the defects of conventional rubber crawlers can be solved and improved as follows, under such conditions that such advantages provided in conventional rubber crawlers as, namely, low noise level, good cushioning, and little fatigue of an operator can be maintained.

(1) As a track link will be combined and will become a continuous rolling track at the inner circumferential side of the crawler body, vibration will be made smaller during use of a vehicle in which the corresponding crawler is adopted.

(2) Such a composition that a pin is fitted and inserted in a pin hole which lies fore and back of respective track links opposed to each other, and both the side ends of the pins are buried in the crawler body will make it strong the combination of the crawler body with the track link, and at this time, since the track links are mechanically combined strongly, the following advantages can be further obtained.

① The crawler come-off will hardly occur during use since almost no elongation of the crawler in the circumferential direction and distortion in the width direction will occur.

② The strength of combination of track links will directly constitute strength of rubber crawler as it is. Accordingly, the durability can be increased.

③ Since sufficient anti-tension force is held in the circumferential direction, and moreover elongation will not occur, use of steel cords indispensable for the conventional rubber crawlers can be excluded.

(3) As the track link will be made a rolling track, use of core members indispensable for the conventional rubber crawler can be excluded.

(4) As steel cords and core members are not needed, cost-down can be accomplished to a large extent as total.

(5) Since a projection of core member is no more needed, a metal mold will be made thinner in thickness than the conventional ones. Therefore, further cost-down can be attempted at such a standpoint as the heat transmission can be increased.

(6) As track links which have been used in part of conventional steel crawlers can be used as they are, it is very advantageous.

(7) As the central portion of core member can be formed to any sectional shape regardless of the tooth bottom of a drive wheel, production cost of the core member is comparatively cheap.

In the present invention, it is better that respective track links are made thin at the fore and back parts thereof, namely, in the mutually opposed relationship in the thickness direction at the circumferential portion of pin hole and mutual combination thereof is carried out under the same thickness condition.

Besides, there is no problem that both the side ends of pin which is fitted and inserted in the pin hole of the track link are directly buried in rubber substance of the rubber crawler body (claim 2). However, in order to strengthen the burying strength thereof, generally, burying member may be used together. In details, for example, as mentioned in claim 3, a burying member consisting of two tubular parts buried in the rubber crawler body and an intermediate part for supporting these tubular parts linearly with a fixed interval spaced is faced sideways, and is arranged at every fixed interval in the circumferential direction, and the pins fitted and inserted in the pin hole of track link are inserted and fixed in a hole of the two tubular parts like erection. At that time, a hole of respective tubular parts is opened to the side of the crawler body with the total length of the burying member agreed with the lateral width of the crawler body, and a nut is screwed in and provided at both the side ends of the pin inserted in the two tubular parts as come-off prevention means (claim 6). Or instead of the above, one of the tubular parts is made shorter, the hole of the shorter tubular part is clogged with rubber substance of the crawler body and it is not opened to one side. On the other hand, a hole of the longer tubular part is opened to the other side of the crawler body, and a nut which is provided as come-off prevention means may be screwed in and provided at one end of the pin fitted and inserted in the two tubular parts (claim 7). In the case that lug is provided at the circumferential side of the crawler body corresponding to each of the tubular parts (claim 8), load acting on the crawler body can be supported under such a condition that its deflection may not be likely to be generated, and vibration during running can be lightened.

The track links must be kept as pair at a fixed distance from the other track links opposed thereto. For that reason, for example, a bushing having a fixed length is fitted at the position between respective track links of the pin fitted and inserted in the pin hole of a pair of the track links (claim 4). In addition, the above composition may be provided by any other prompt means not using the bushing.

The bushing or the pin in the case that the bushing is not utilized will be engaged to the teeth of a sprocket which drives or guides the crawler body. At that time, the sectional circumferential shape of the bushing or the sectional shape of the pin are made coincident with the tooth profile of the above sprocket (claim 5).

It is preferable that as mentioned in claim 10, a circumferentially continued thickness-reduced part is provided at the upper edge at the side of circumferential recess groove formed at the intermediate part of the above burying member. If so constructed, even though the rolling track formed by the track link is inclined sideways due to rocking displacement of the whole crawler, the rolling wheel will not come into contact with the crawler body, and the crawler body can be prevented from damages.

As mentioned in claim 9, the crawler body which will be the outer circumference of the tubular parts of the burying member can have a reinforcement core buried. If so, it is possible to increased the strength against load partially acting on the position between respective burying members.

Moreover, the crawler body may be made of urethane rubber, urethane resin, hard rubber or plastic elastic body, etc., in addition to rubber elastic body (claim 12).

COMPOSITION OF THE SECOND INVENTION

The second invention is characterized by a rubber crawler in which a burying member as a core member is buried at a fixed interval with the lengthwise direction thereof and at a right angle to the circumferential direction of the crawler body. The lug is projected circumferentially.

The burying member consists of flat-shaped right and left wing portions and a recess-shaped central portion. Mounting means like bolts, welding, etc., for mounting track links is provided at both the sides of the central portion.

The right and left wing portions of the burying member are buried in the rubber substance of the crawler body, and at the same time the position of the above mounting means is exposed at least to the inner circumferential side of the crawler body or is coated with a thin rubber layer.

On the other hand, a pin hole is provided at both the sides of the track link, mounting means for mounting a burying member is provided at the underside between the pin holes, and the interval between the pin holes is equal to the interval of the central portions of the adjacent burying members. Furthermore, the track links are mounted from the inner circumferential side of the crawler so that respective burying members are aligned with the position of the mounting means in the up and down direction, and at the same time the upper side edge of the link is projected by a fixed height above the rubber crawler body. On the other hand, pins are fitted and inserted in pin holes which make the fore and back track links aligned with each other at the intermediate position of the adjacent burying members and are combined so that the track links pivot with respect to one another.

Thereby a track by means of a pair of continuous track links is formed at both the sides of the central portion of the crawler body.

In the present invention, as well as the first invention, since a continuous rolling track is formed by combining track links at the inner circumferential side of the rubber crawler, advantages similar to the above can be obtained in relation to the above. Also, in the present invention, as an example of the mounting means the track links are combined with bolts by installing bolt holes at both the sides of the central part of the burying member. As another example of the mounting means respective mounting positions of the burying member and track links are welded and combined by aligning them in the up and down direction. For that reason, the work of mounting the track links can be comparatively easily carried out. Moreover, rubber crawlers can be comparatively easily and cheaply manufactured as a whole.

In the present invention, it is better that the crawler body between the burying members is bent and curved to be high toward the inner circumferential side (claim 13). If so composed, since the height of the crawler body is made almost equal to that of the link pins, this portion is almost free from any elongation while it is placed on the curvature part of the drive wheel or idle wheel, and a lowering of the durability of the rubber crawler will not from accumulation of fatigue through repeated elongation.

The right and left wing portions of the burying member can be shaped so as to be like a sweptback wing shape relative to the central portion; a lug can be provided at the outer circumferential side of the crawler body corresponding to the right and left wing portions; and a part of the lug can be located on the extension of the centerline of the link pin (claim 14). Thus, as this portion will hardly drop even when the rolling wheel rides on the link pin, vibration during running can be reduced to a large extent.

It is possible to provide a reinforcement layer continuous in the crawler body and in the circumferential direction passing in the vicinity, in the up and down direction of both the right and left wing portions of the burying member in the up and down direction (claim 15). Thus, even in the case that the crawler body rides on a projection on the road surface, the crawler body will not be damaged due to remarkable elongation.

BRIEF DESCRIPTION OF THE DRAWINGS

FIG. 4 through FIG. 9 relate to the first invention;

FIG. 4 is a perspective view of of burying member;

FIG. 5A is the plan view thereof;

FIG. 5B is the front elevational view thereof; and

FIG. 5C is the sectional view taken along the line X—X of

FIG. 5A.

FIG. 6A is the plan view thereof,

FIG. 6B is the front elevation view thereof;

FIG. 7 is a partially broken perspective view of one of the preferred embodiments, FIG. 8 is a sectional view of the preferred embodiment, and FIG. 9.is a view showing another preferred embodiment.

FIG. 10A through FIG. 20B relate to the second invention,

FIG. 10A through FIG. 14B are views for the first preferred embodiment; FIGS. 10A, 10B and 10C show a burying member to be used in the preferred embodiment;

FIG. 10A is a perspective view;

FIG. 10B is a side view;

FIG. 10C is a top plan view;

FIG. 11A is the plan view thereof;

FIGS. 11B and 11C are the sectional views taken along the lines X1—X1 and X2—X2 of FIG. 11A;

FIG. 12 is a perspective view of the rubber crawler body;

FIG. 13A is the front elevational view thereof;

FIG. 13B is the bottom view thereof, and

FIGS. 14A and 14C are views partially showing the status under which the track link is installed on the rubber crawler body;

FIG. 14A is the front elevation view thereof,

FIG. 14B is the sectional view thereof;

FIG. 15 is a view explaining the turning and winding status of a combination linkage type rubber crawler of the present invention onto the drive wheel or the idle wheel;

FIG. 17 shows the third preferred embodiment of the present invention;

FIG. 18A through FIG. 20B show the fourth preferred embodiment of the present invention;

FIGS. 18A–18D show the burying member to be used in the preferred embodiment;

FIG. 18A is a perspective view thereof;

FIG. 18B is the plan view thereof;
FIG. 18C is the side view in the width direction thereof;
FIG. 18D is the side view in the lengthwise direction thereof;
FIG. 19A is the front elevational view thereof;
FIG. 19B is the bottom view thereof;
and
FIGS. 20A and 20B show a rubber crawler body;
FIG. 20A is a view of partial status under which the track link is provide;
and
FIG. 20B is the plan view at the outer circumferential side.

A PREFERRED EMBODIMENT OF THE FIRST INVENTION

Firstly, a preferred embodiment related to the first invention is described with reference to FIG. 4 through FIG. 9.

Figure 1:
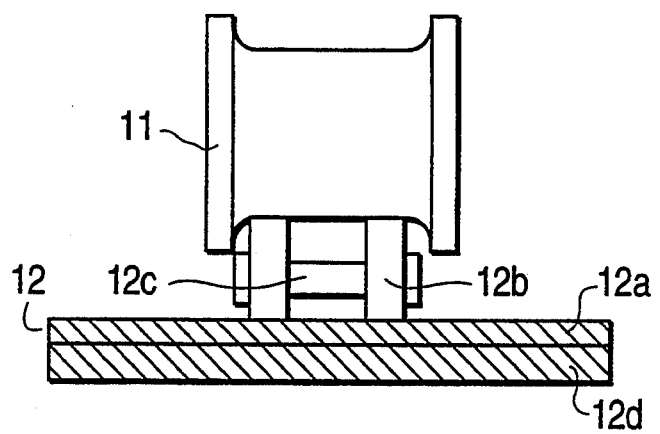
FIG. 1 is a sectional view showing an example of conventional steel crawler.
Figure 2:
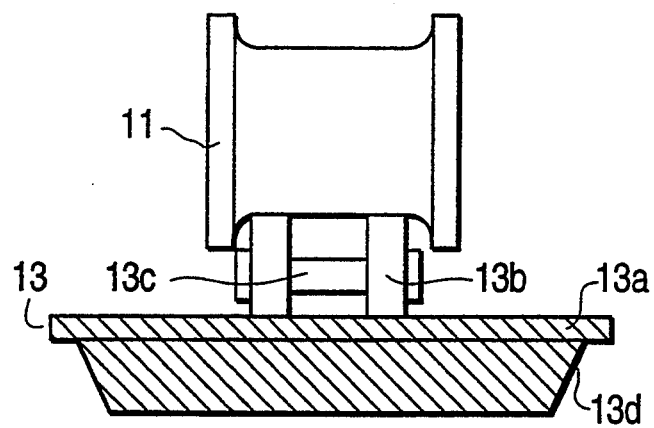
FIG. 2 is a sectional view showing an example of conventional rubber crawler.
Figure 3:
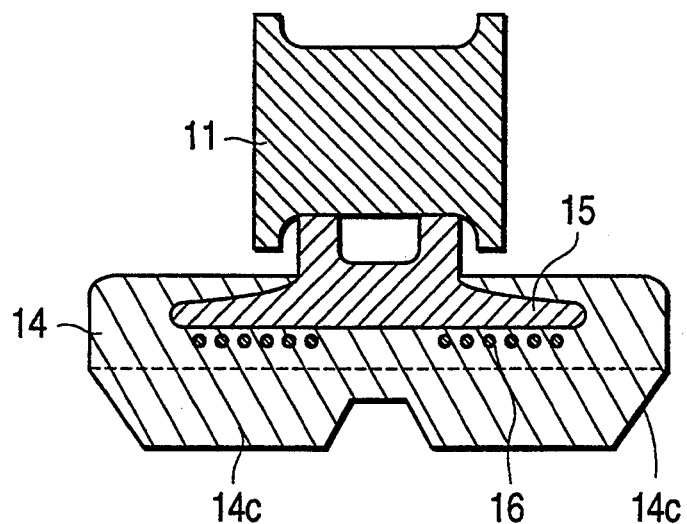
FIG. 3 is a sectional view of the conventional rubber crawler.
Figure 4:
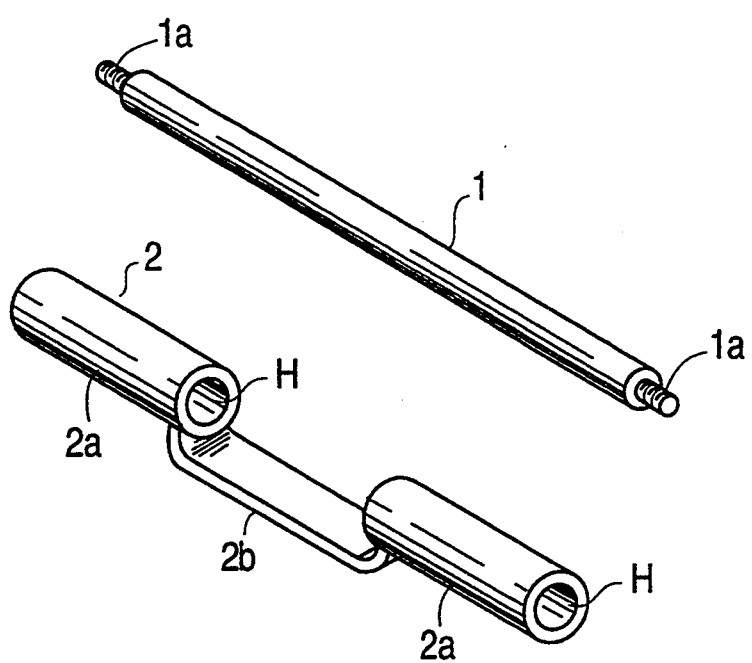

In FIG. 4, 1 is a pin having screw portions $1a$ and $1b$, 2 is a burying member; $2a$ and $2a$ are tubular portions; $2b$ is the intermediate portion thereof; H is a hollow hole inside the tubular portions $2a$, and the outer diameter of the pin 1 is designed with such dimensions that it can be promptly fitted to the hollow hole H.

Figure 5A:
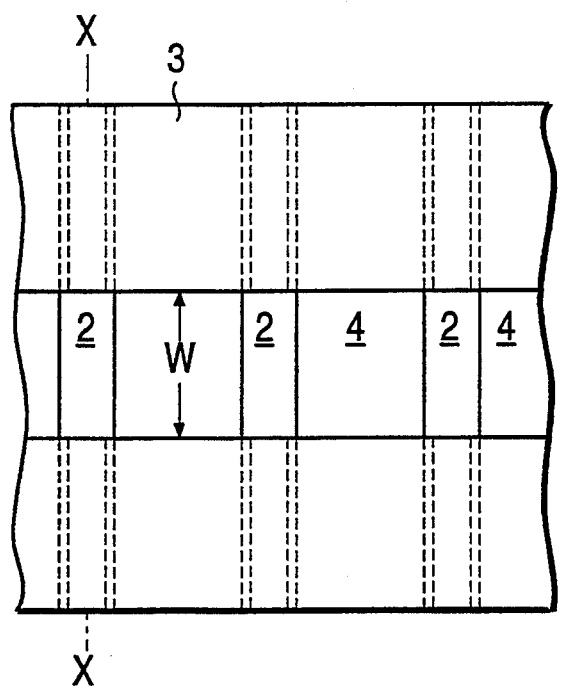
FIGS. 5A, 5B and 5C show a rubber crawler in which the burying member is built.
Figure 5B:
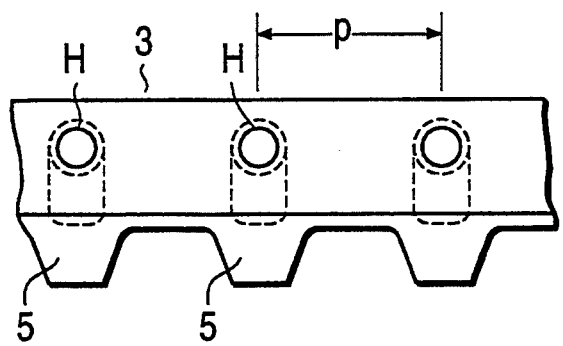
Figure 5C:
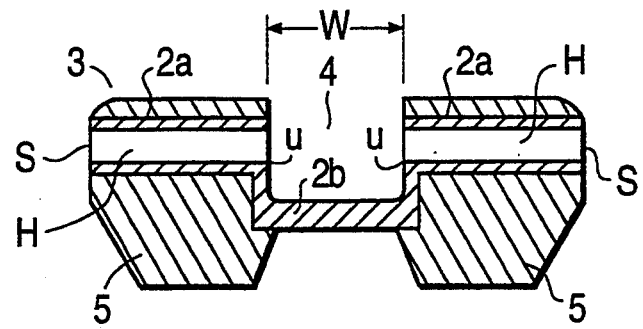

FIGS. 5A, 5B and 5C show a rubber made crawler body 3 in which the above burying member 2 is buried; FIG. 5A is the plan view thereof; FIG. 5B is the front elevational view thereof; FIG. 5C is a sectional side view taken along the line X—X of FIG. 5A, 4 represents a recess groove, 5 is a lug provided corresponding to respective tubular portions $2a$ at the outer circumferential side of the crawler body 3. In the present preferred embodiment, the width W of the recess groove 4 is made equal to the interval of the intermediate portion $2b$ of the burying member 2, and a hollow hole H is opened through at the counter faces u, u where the burying member 2 of the recess groove 4 is located, and the length of the burying member 2 is made equal to the lateral width of the rubber crawler 3 and a hollow hole H is opened through at both the sides S, S of the rubber crawler 3. Also, P represents the interval of the burying member 2.

Figure 6A:
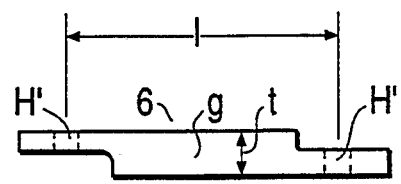
FIGS. 6A and 6B show a track link.
Figure 6B:
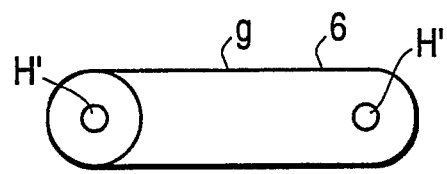

FIGS. 6A and 6B show a composition of the track link; FIG. 6A is the plan view thereof; FIG. 6B is the front elevational view thereof; H' is a pin hole; g is the upper side edge, t is the thickness, respectively. Herein, the interval l between the right and left pin holes is formed to the dimension equal to the interval P of the burying member 2, and at the same time, the vicinity portion of the pin holes H' is made thinner in the thickness (half the thickness t) in a mutually opposed relationship at the right and left positions, thereby causing combination of the fore and back track links 6 to be made with the same thickness. Also, the upper side edge g is formed to be flat and will act as rolling track.

Figure 7:
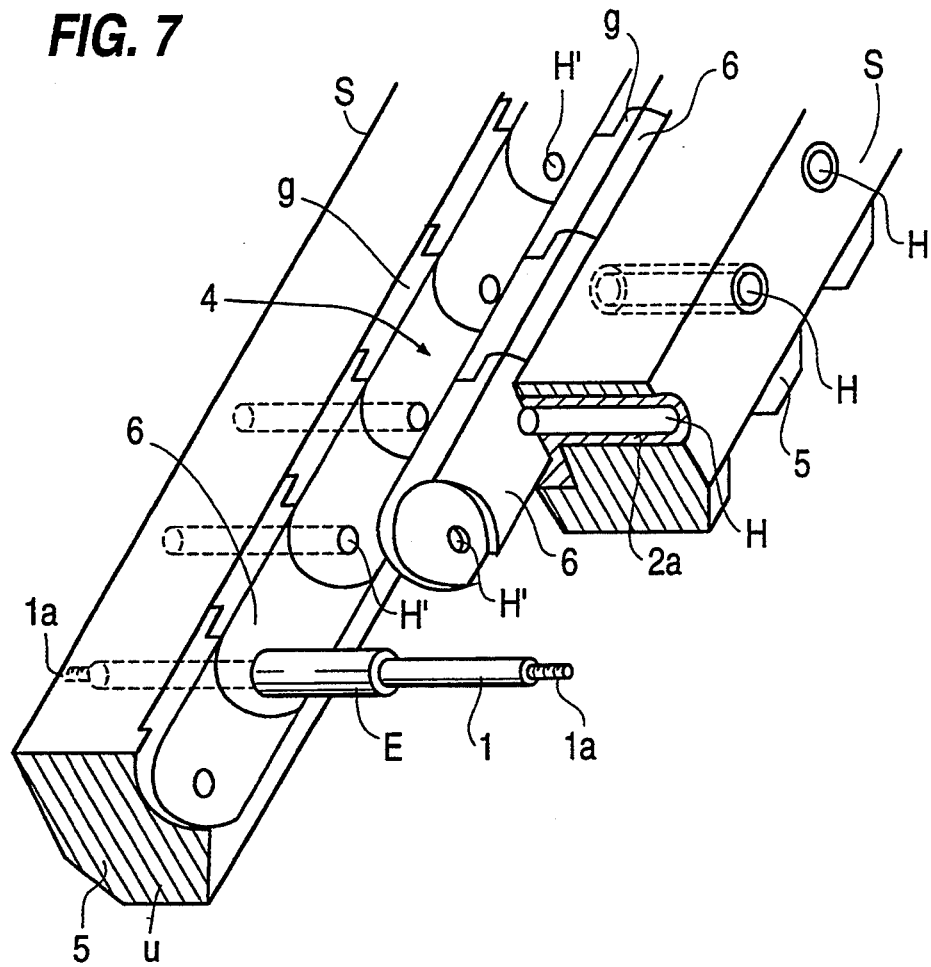

FIG. 7 is a partially broken perspective view of the present preferred embodiment, track links 6, 6, ... are arranged in a row in the vicinity of both the sides u, u of the recess groove 4, and the pin 1 is penetrated through the pin holes H' and hollow hole H which are piled up in the fore and back direction. At that time, E is a bushing externally fitted to the pin between mutually opposed track links 6, 6, and acts as spacing means of the two track links 6, 6. In the present preferred embodiment, this bushing E will be designed to be engaged with the teeth of sprocket. Furthermore, another means may be available as spacing means between the right and left track links. It is necessary to provide an adequate come-off prevention means in order to prevent the pin 1 from dropping from the hollow hole H of the tubular portions $2a$, $2a$, but in the present embodiment, a nut is screwed and fixed to a screw portion $1a$.

Figure 8:
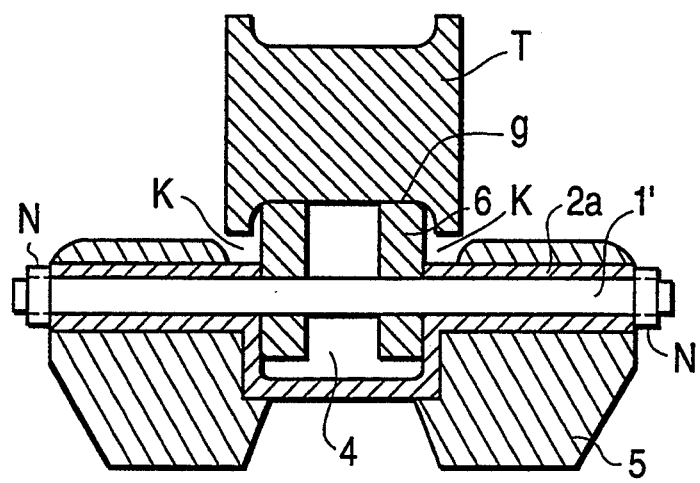

FIG. 8 is a sectional view of the present preferred embodiment, as shown therein, the upper side edge g of the track link 6 will be a rolling track on which the rolling wheel T rotatingly moves. However, k is a thickness reduced portion which is continuously provided on the upper edge of the side u (Refer to C in FIG. 5) of the recess groove 4, and prevents in advance the rubber substance of that area from being scooped out due to that the outer flange of the rolling wheel T is brought into contact with the rubber substance of that area owing to lateral rolling of the equipment body in the case that the thickness-reduced portion k is not provided. In the Figure, N is a nut screwed and fixed to the screw portion $1a$.

Figure 9:
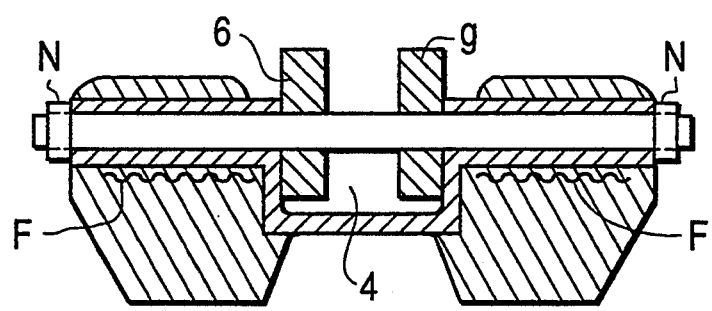

FIG. 9 shows another preferred embodiment of the invention. As shown therein, it is such that a reinforcement core F is buried at the outer circumferential side of the tubular portions $2a$ of the burying member 2. The point thereof is as follows; Namely, in the preferred embodiment, since the track link 6 is firmly combined with the whole circumference of the crawler body 5, there is no need to bury elongation resisting members like steel cords, etc. which are indispensable to conventional rubber crawlers. Since the crawler body 5 between the fore and back burying members 2, 2 is made only of rubber substance and has no reinforcement core, it is because of preventing in advance that portion from being damaged through extraordinary elongation due to riding on obstacles like stones. Furthermore, the reinforcement core F may be of natural or artificial fibers or fabric of metal fibers, or these fiber cords may be used. Moreover, a small quantity of steel cords may be used instead.

In the above preferred embodiment, as for the burying member 2, one of the tubular parts $2a$ is made shorter, and come-off prevention means may be installed only at the side S of the crawler body 5 at the side where longer tubular part is buried.

Also, it is all right that a pin 1 is directly buried in the crawler bodies 3, 3 without use of the burying member 2. In this case, a track link 6 in which a pin 1 is fitted and inserted is arranged in a long-sized metal mold together with non-vulcanized rubber, and press-vulcanized, thereby causing the pin 1 to be buried at the same time when the crawler body 5 is vulcanized and molded.

In the present invention, rubber substance of the crawler body 5 includes usual rubber elastic body, urethane rubber, or urethane resin, other hard rubber, or plastic elastic body.

A PREFERRED EMBODIMENT OF THE SECOND INVENTION

A preferred embodiment of the second invention is described with reference to FIGS. 10A, 10B and 10C through FIGS. 20A and 20B. Then, the same symbols are given to the parts substantially identical to those in the first invention.

Figure 10A:
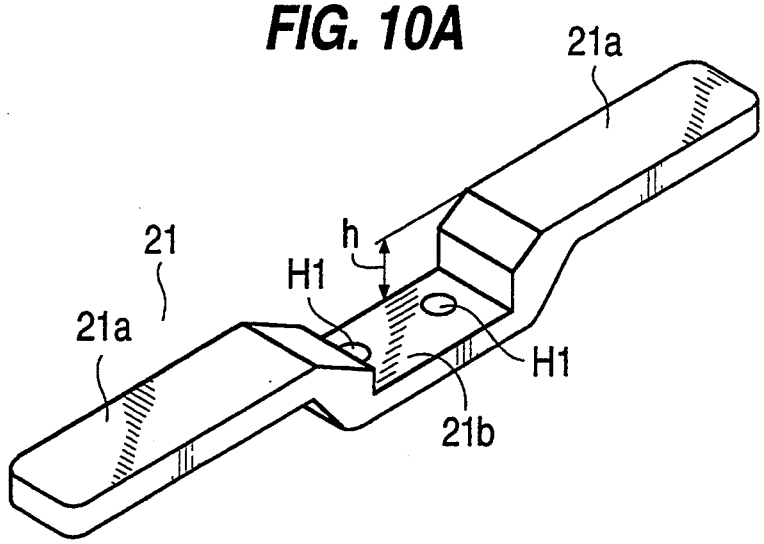
Figure 10B:
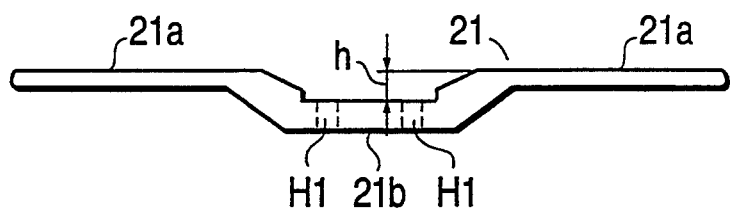
Figure 10C:
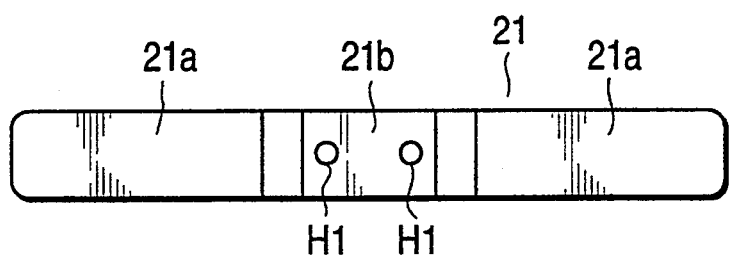

FIGS. 10A, 10B and 10C show a burying member or core bar 2 to be used in the first preferred embodiment of the present invention; FIG. 10A is a perspective view; FIG. 10B is a side view, and FIG. 10C is the top surface view. In the Figures, $21a$, $21a$ are right and left wing portions, 21b is a recess-shaped central portion, H1, H1 are bolt holes (through holes) provided at both the sides of the central portion 21b, h is a step by which the central portion 21b is located at a lower level than the wing portions 21a.

Figure 11A:
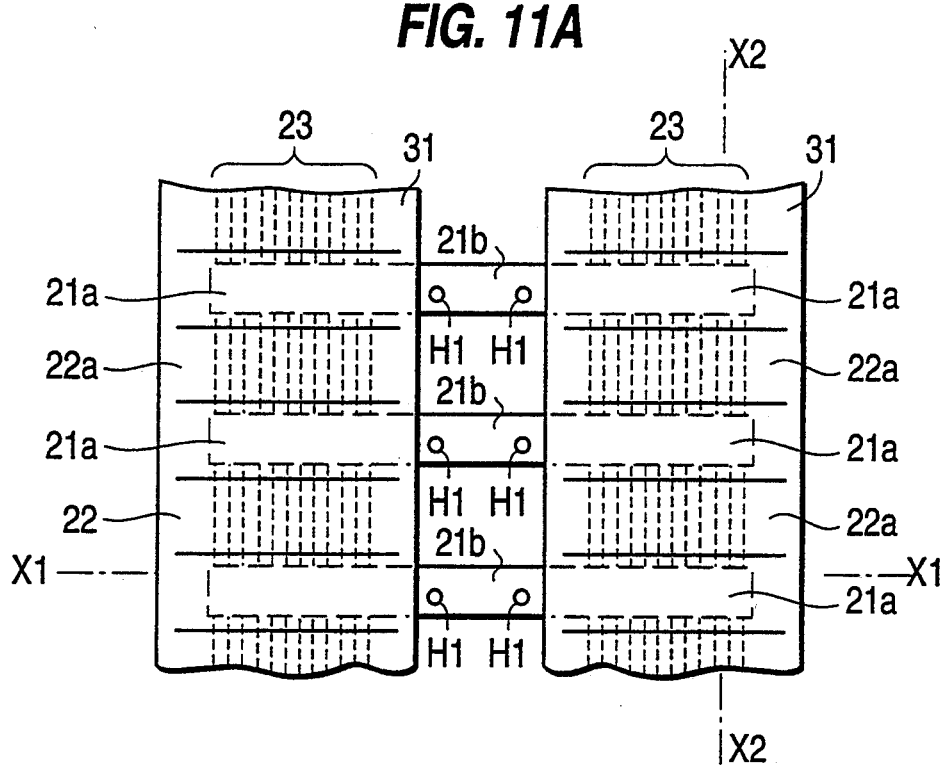
FIG. 11A, 11B and 11C show the crawler body.
Figure 11B:
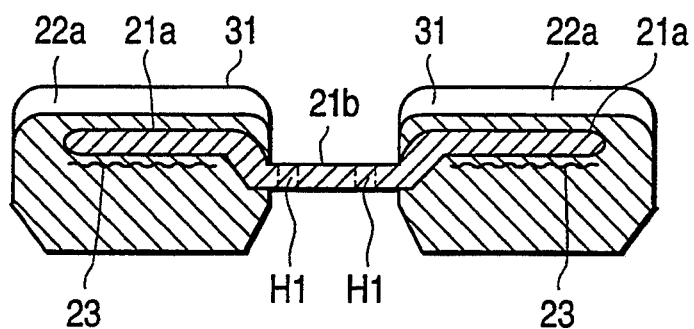
Figure 11C:
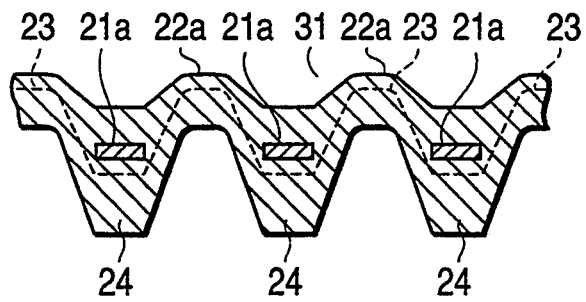

FIGS. 11A, 11B and 11C show a rubber-made crawler bodies 31, 31 in which the burying member or core bar 21 is buried; FIG. 11A is the plan view thereof: FIGS. 11B and 11C are the sectional views taken along the lines X1—X1 and X2—X2 of FIG. 11A. As shown therein, the right and left wing portions 21a, 21a are buried in the rubber substance of the crawler body 31, and at the same time, the periphery of of the bolt holes H1, H1 at the central portion 21b is not buried. However, the central portion 21b can be shielded with rubber substance having optional thickness, excluding the periphery of the bolt holes H1, H1 at the inner circumferential side.

Figure 12:
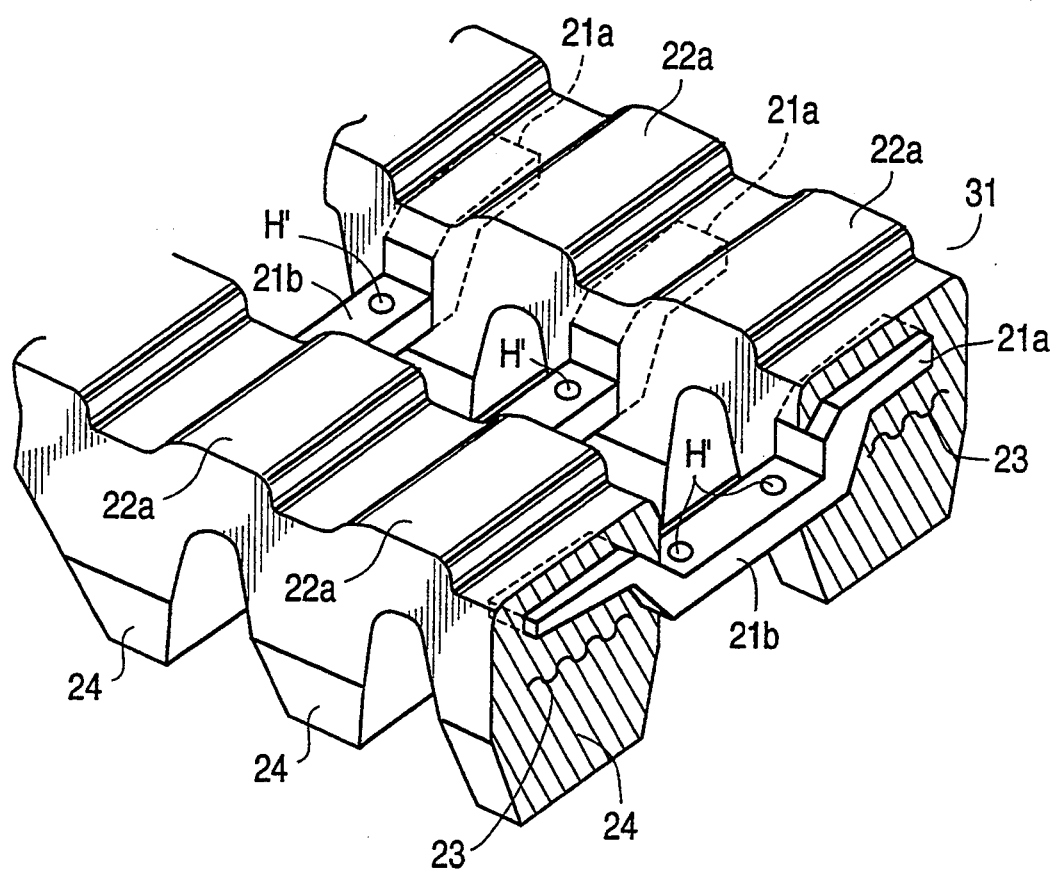

A curvature part is defined in the crawler body between the wing portions 21a, 21a which are adjacent to each other in the circumferential direction, the curvature part curving to be high toward the inner circumferential side; 23 is a reinforcement layer continued in the circumferential direction; as shown in the drawing, in the present preferred embodiment, the reinforcement layer 23 is made wave-like as it is buried through the lower side of the wing portion 21a; 24 is a lug projected on the outer circumferential face corresponding to the wing portion 21a. FIG. 12 is a perspective view of the above rubber crawler body 31.

Figure 13A:
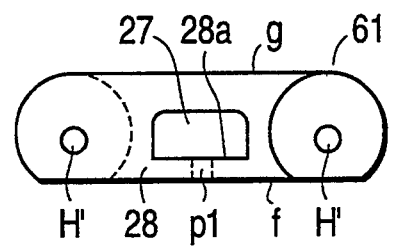
FIGS. 13A and 13B show a, track link to be used in the preferred embodiment.
Figure 13B:
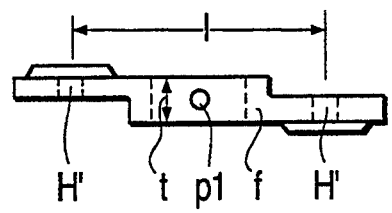

FIGS. 13A and 13B show a piece of the track link 61 to be used in the present preferred embodiment; FIG. 13A is the front elevational view thereof; FIG. 13B is the bottom view thereof; it is the same as that which has been used in a part of the conventional steel crawlers. In the Figure, H' is a pin hole; the interval l between the right and left pin holes H', H' is made with the dimension equal to the interval of the burying member 21; 27 is a window; 28 is a lower frame of the window 27; p1 is a bolt hole for installing the track link 61 at the central part 21b of the burying member 21; As shown in the drawing, the bolt hole p1 is penetrated through the lower face f of the track link from the upper face 28a of the lower frame 28. Furthermore, the upper face g of the track link 61 is made flat and acts as rolling track. The vicinity part around the right and left pin holes H', H' is made thinner in thickness (half the thickness t) in mutually opposed relationship in the right and left positions, thereby causing combination of the fore and back track links 61 to be achieved under the same thickness condition. According to the above combination, a pair of the track links 61, 61 are vertically provided at both the sides of the central part 21b by making the above bolt hole p1 coincident with the bolt hole H1 of the central part 21b of the burying member or core bar 21 and fixing the mutually communicated bolt holes p1 and H1 with a bolt, simultaneously respective pin holes of the fore and back track links 61, 61 are piled up; a link pin is rotatably inserted in the piled up pin holes H', H', thereby causing the track links to be combined and continued. Thus, the track links can act as rolling track.

Figure 14A:
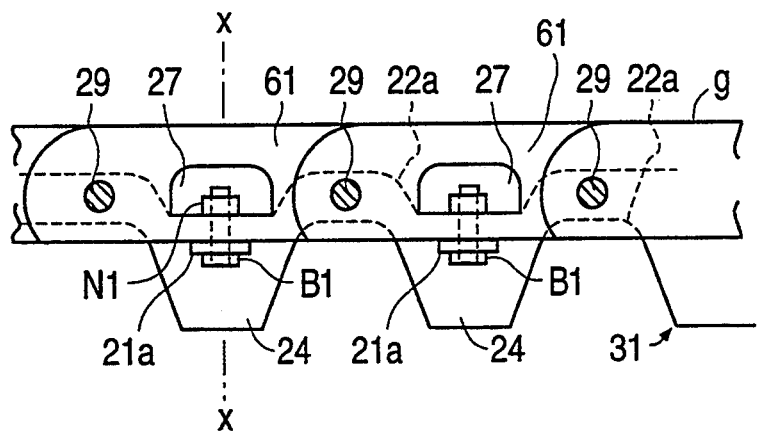
Figure 14B:
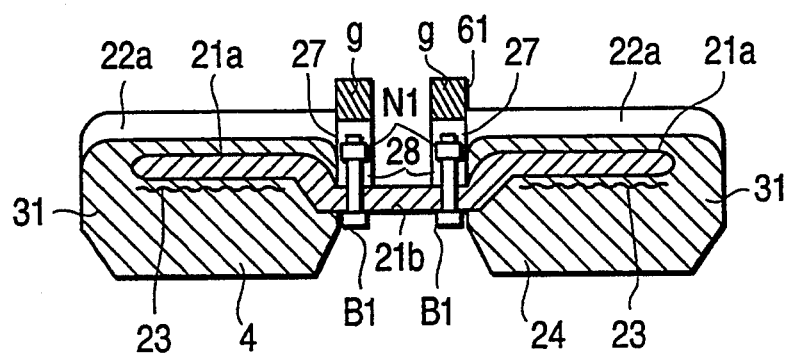

FIGS. 14A and 14B are a view of partial status under which the track links 61 are mounted at the crawler body 31 of the present preferred embodiment; FIG. 14A is the front elevational view thereof; FIG. 14B is the sectional view thereof; In the Figure, 29 is a link pin. Furthermore, B1 is a bolt, N1 is a nut.

Hereupon, the mounting means of the burying member 21 and the track links 61 may be welding as well as bolt-fastening means, and any other means may be acceptable.

The mounting position is not limited to the central position of the track links 61, and the burying member and track links may be mounted at any optional position between the right and left pin holes H', H'.

Figure 15:
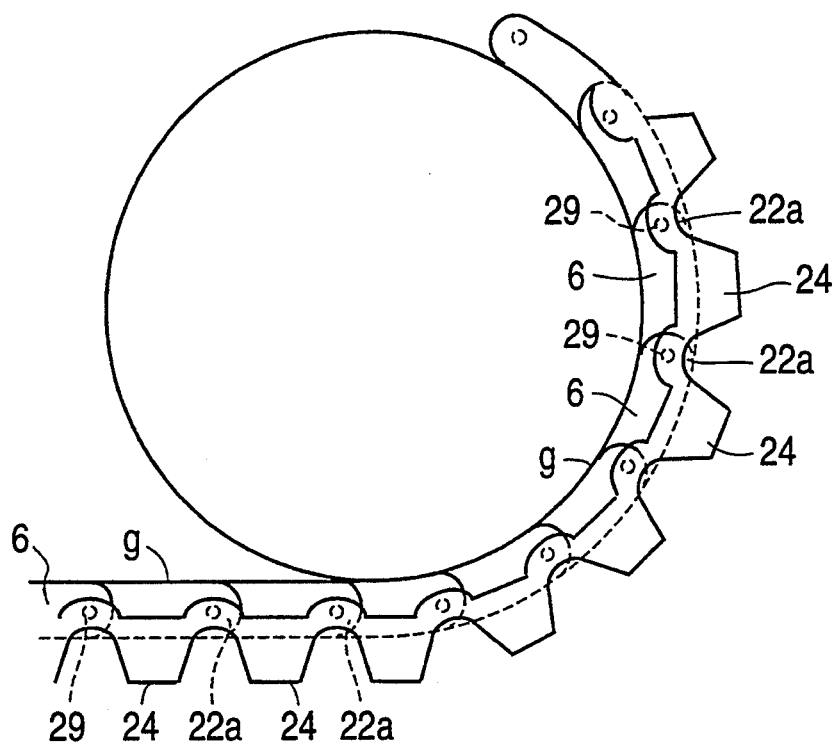

FIG. 15 explains the turning and winding condition on the drive wheel and idle wheel of the combination link type rubber crawler according to the present invention. At the turning and winding portion, the outer circumferential side from the connecting line of link pins 29, 29, . . . is elongated, and the ratio of elongation will be made larger toward the outer circumferential side. On the other hand, at the crawler body 31, the burying portion of the burying member is not elongated, and the interval between the burying members is elongated. Accordingly, as the ratio of elongation of this portion becomes large, the fatigue is accumulated due to repeated elongation to spoil its durability. However, in the present preferred embodiment, (1) As a step h is provided between the wing portion 21a of the burying member 21 and the central portion 21b to lower the central portion 21b, the track links 61 are designed to be mounted at a comparatively low position, (2) As a curvature 22a is provided between the burying members 21 of the crawler body 31, this portion will be made higher toward the inner circumferential side and its height thereof is made almost equal to that of the link pin 29. For that reason, almost no elongation occurs at the turning and bending portion. Therefore, a problem of fatigue accumulation will not occur.

Hereupon, in the case that the crawler body 31 between the above burying members 21 is made of only rubber substance, this portion rides on a projection on the road surface and may be damaged due to being remarkably elongated. In order to prevent that in advance, a reinforcement layer 23 may be buried. Natural or artificial fibers having high strength, or fabrics of metal fibers, or the fiber cords, thereof may be used as reinforcement layer 23; a small quantity of steel cords may be used, too. It is preferable that the burying position of the reinforcement layer 23 is to almost the same height as the link pins 29 in the crawler body 31 due to the above reason. If necessary, the reinforcement layer may be provided in a plurality, and still furthermore may be buried at the top of the burying members.

Figure 16A:
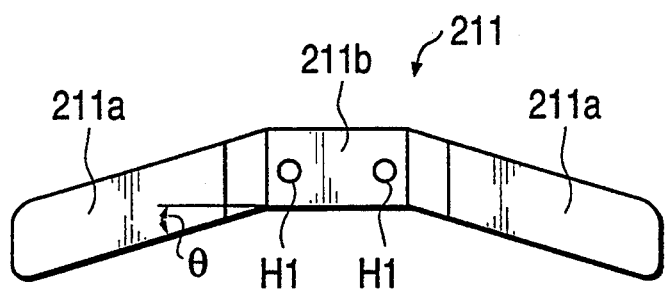
FIG. 16A is the plan view of the burying member to be used in the preferred embodiment.
Figure 16B:
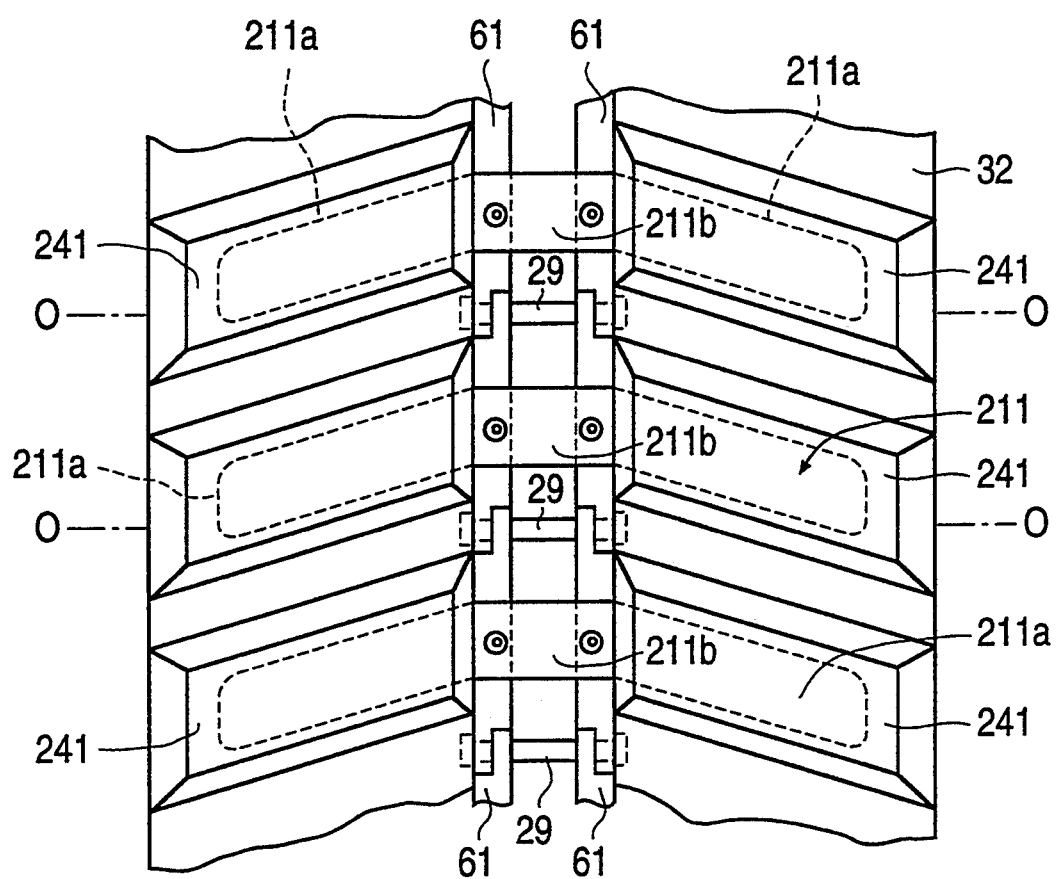
FIG. 16B is the plan view at the outer circumferential side of the rubber crawler side.

FIGS. 16A and 16B show the second preferred embodiment of the present invention; FIG. 16A is the plan view of burying member 211 to be used in the present preferred embodiment; FIG. 16B is the plan view at the outer circumferential side of the rubber crawler body 32 according to the present preferred embodiment. As shown in FIG. 16A, in the burying members or core bars 211, the right and left wing portions 211a, 211a are shaped so as to be like sweptback wing to the central portion 211b (Sweptback angle: θ). A lug 241 is provided at the outer circumference in response to the wing portion 211a with the burying member 211 buried in the rubber crawler body 32; as shown in FIG. 16B, a part of the lug is designed to be located on the extension line of the centerline O of the link pin 29, and the rolling wheel is almost free from any drop at this portion, thereby causing vibrations during running to be much lightened.

Figure 17A:
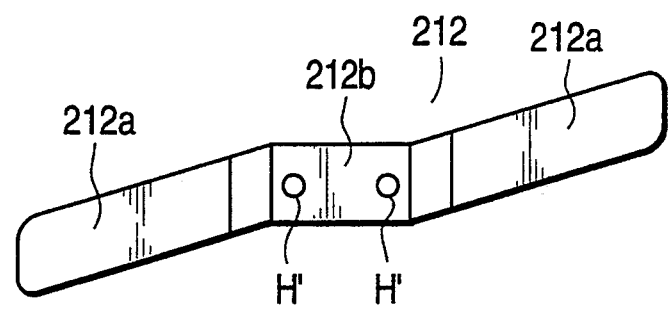
FIG. 17A is the plan view of the burying member to be used in the preferred embodiment.
Figure 17B:
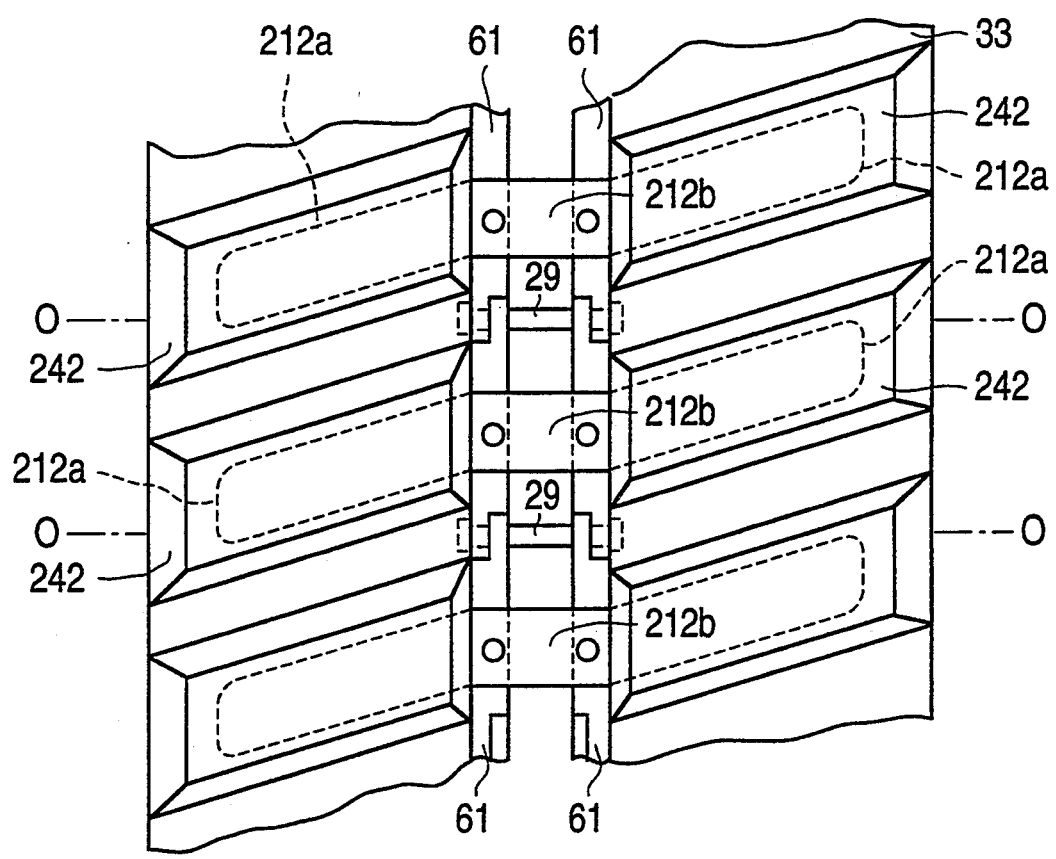
FIG. 17B is the plan view at the outer circumferential side of the rubber crawler body.

FIGS. 17A and 17B show the third preferred embodiment of the present invention; As shown in FIG. 17A, the right and left wing portions 212a, 212a of the burying member or core bar 212 are formed to be stepped, respectively. A lug 242 is provided at the outer circumference corresponding to the wing portion 212a with these wing portions buried in the rubber crawler body 33 as well as in the above preferred embodiment; as shown in FIG. 17B, a part of the lug 242 is located on the extension line of the centerline O of the link pins 29, thereby causing the same effects as those in the second preferred embodiment to be obtained.

Figure 18A:
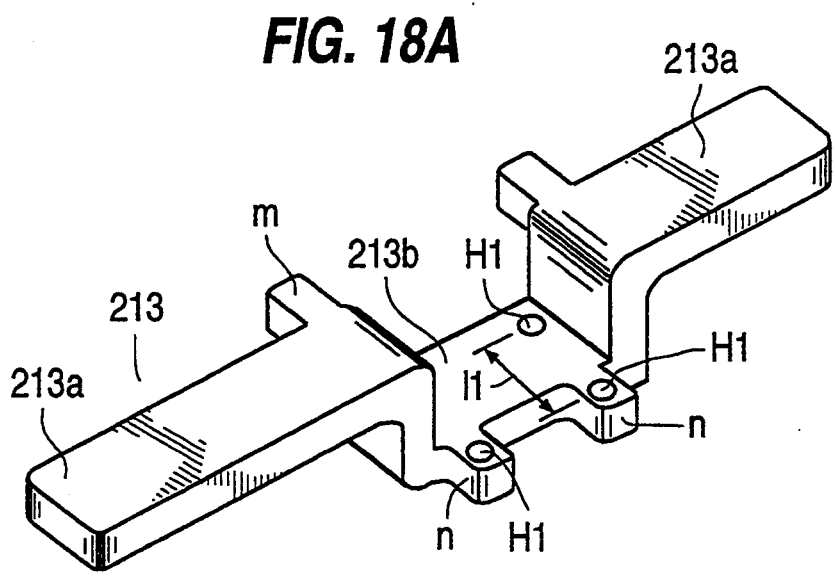
Figure 18B:
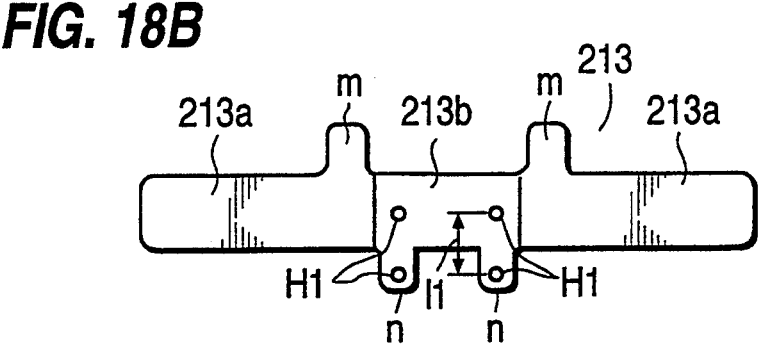
Figure 18C:
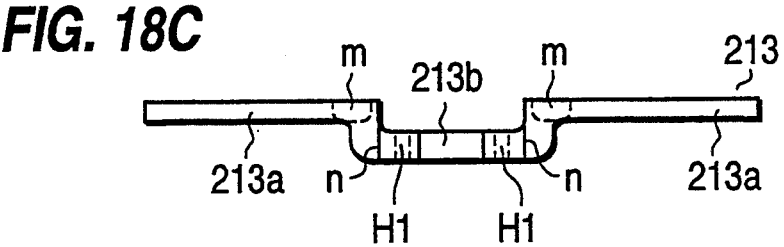
Figure 18D:
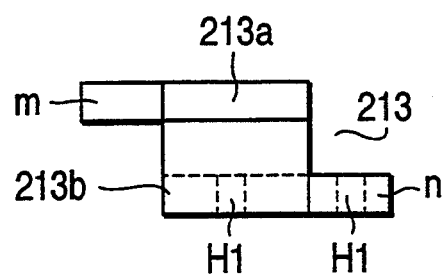

FIGS. 18A-18D show a burying member 213 to be used in the fourth preferred embodiment of the present invention; FIG. 18A is a perspective view thereof, FIG. 18B is the plan view thereof, FIG. 18C is a side elevational view in the lengthwise direction, and FIG. 18D is a side elevational view in the width direction. In these Figures, m, m represent projections provided at the side close to the central part of the right and left wing portions 213a, 213a; n, n represent central projections provided at both the sides of the central portion 213b; bolt holes H, H are pierced and provided at both the central projections n. For that reason, as shown therein, bolt holes H, H are provided parallelly with the interval l1 at both the sides of the central portion 213, respectively.

Figure 19A:
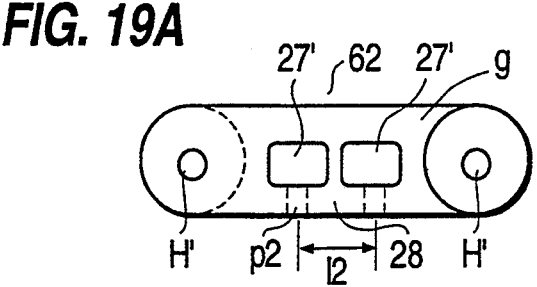
FIGS. 19A and 19B show a track link to be used in the preferred embodiment.
Figure 19B:
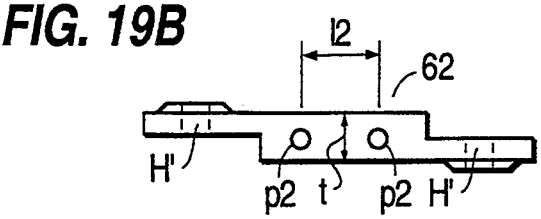

FIGS. 19A and 19B show a piece of the track links 62 to be used in the present invention; FIG. 19A is the front elevational view thereof; FIG. 19B is the bottom view thereof. As shown in these Figures, bolt holes p2, p2 are provided at two points of the lower frame 28, and the interval l2 is secured with the dimension equal to the interval l1 between bolt holes at the central portion 213b of the above burying member 213.

Figure 20A:
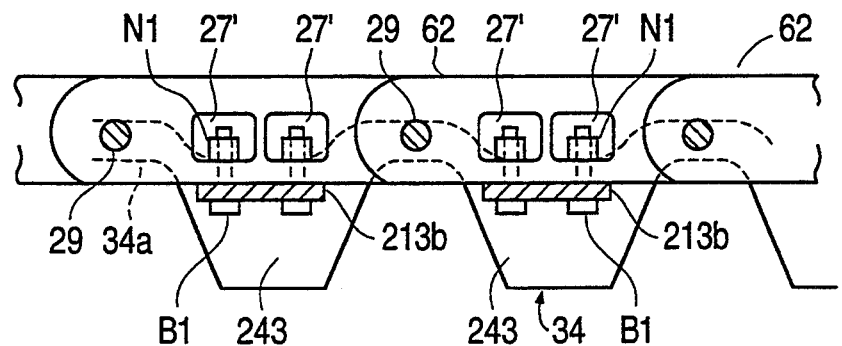
Figure 20B:
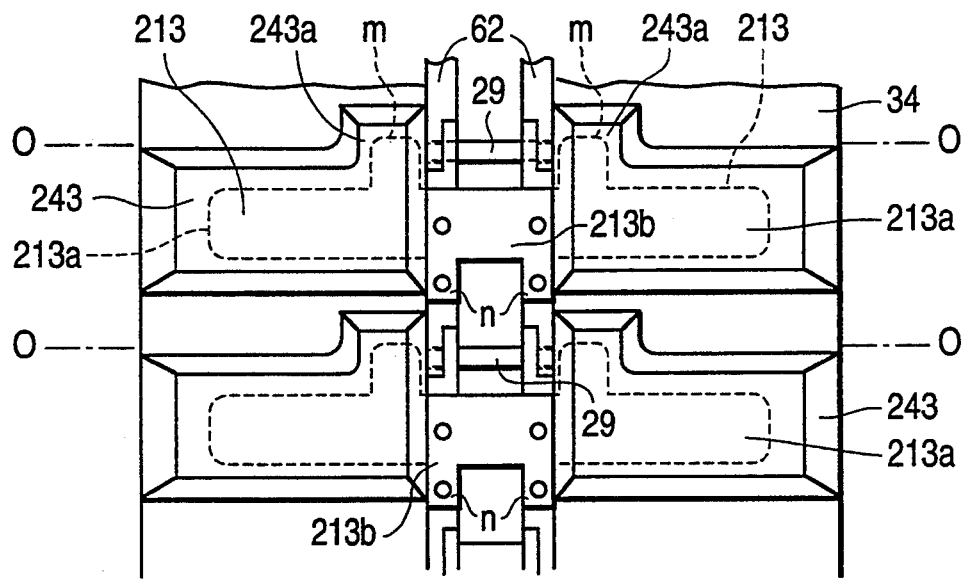

FIGS. 20A and 20B show a rubber crawler of the above preferred embodiment; FIG. 20A is a view of partial status under which the track links 62 are mounted at the crawler body 34; As shown therein, the track links 62 are fixed with bolts together with the central portions 213b of the burying member at two points. FIG. 20B is the plan view at the outer circumference of the crawler body 62. As shown therein, a lug projection 243a is provided at the side of the lug 243 corresponding to the central projection portion m of the burying member 213, and the lug projection 243 is designed to be located on the extension line of the centerline O of link pin 29 of the track link 62. For that reason, the rolling wheel is free from any drop at the position of the link pins 29, thereby causing vibrations during running to be much reduced. Furthermore, 34a is a portion curved to the inner circumferential side of the crawler body 34.

In the above combination linkage type rubber crawler of the present invention, the link pins 29 are engaged with the drive wheel to transmit drive force, and the central portion of the burying members or core bars 21, 211, 212, and 213 may be of any optional sectional shape regardless of the tooth bottom of the drive wheel. For that reason, the production cost of burying members or cores bars will be comparatively cheap. Besides, track links 62, 62 which have been manufactured for the sake of conventional steel crawlers can be utilized as they are. Thus, it is very advantageous.

FIELD OF INDUSTRIAL APPLICATION OF THE INVENTION

As described above, a combination linkage type rubber crawler is utilized for a running device of transportable type construction machines, etc. Especially, it is most preferable for such a vehicle as in which steel crawler and rubber crawler can be concurrently used.

What is claimed is;

1. In a rubber crawler having a crawler body and burying members buried in the crawler body at a fixed interval, each burying member having a lengthwise direction at a right angle to the circumferential direction of the crawler body, and the crawler body having a lug provided on and projecting from the outer circumference of the crawler body, the improvement comprising:

each burying member comprises right and left flat-shaped wing portions and a central portion having mounting means to fix track links spaced apart on the central portion;

the crawler body comprises a rubber substance, the right and left wing portions are buried in the rubber substance of the crawler body, and the central portion is either exposed at least to an inner circumferential side of the crawler body or shielded with a thin rubber layer;

the track links have opposite ends and a pin hole adjacent to each of said ends, mounting means for mounting each of said track links on a burying member is provided at an underside of each said link between respective pin holes, the interval between the pin holes of a link is equal to the interval between the centers of the central portions of adjacent burying members, the track links are mounted on the inner circumferential side of the crawler body in alignment with the respective mounting means coupled with each other in the up and down direction, and the link has an upper side edge positioned at a fixed height above the rubber crawler body;

adjacent pin holes of adjacent links are aligned with each other between adjacent burying members, and a pin is positioned in the aligned adjacent pin holes so that the adjacent links pivot relative to one another;

whereby a track is formed at the central part of the crawler body by a pair of continuous track links.

2. A combination linkage type rubber crawler claimed in claim 1, wherein the crawler body between the burying members is bent and curved so as to become high toward the inner circumference of the crawler body.

3. A combination linkage type rubber crawler claimed in claim 2, wherein the right and left wing portions of the burying member are formed like swept-back wings or are stepped relative to the central part, and a lug is provided at the outer circumferential side of the crawler body at the right and left wing portions.

4. A combination linkage type rubber crawler claimed in claim 2, wherein a circumferentially continuous reinforcement layer is buried inside the crawler body.

5. A combination linkage type rubber crawler claimed in claim 1, wherein the right and left wing portions of the burying member are formed like swept back wings or are stepped relative to the central part, and a lug is provided at the outer circumferential side of the crawler body at the right and left wing portions.

6. A combination linkage type rubber crawler claimed in claim 5, wherein a circumferentially continuous reinforcement layer is buried inside the crawler body.

7. A combination linkage type rubber crawler claimed in claim 1, wherein a circumferentially continuous reinforcement layer is buried inside the crawler body.

8. A combination linkage type rubber crawler claimed in claim 5, wherein a circumferentially continuous reinforcement layer is buried inside the crawler body.

9. A combination linkage type rubber crawler claimed in claim 1, wherein the crawler body is made of any one of rubber elastic body, urethane rubber, urethane resin, hard rubber or plastic elastic body.

10. A combination linkage type rubber crawler claimed in claim 1, wherein said central portion of the burying member is recessed relative to the right and left flat-shaped wing portions.

11. A combination linkage type rubber crawler claimed in claim 10, wherein the crawler body is made of any one of rubber elastic body, urethane rubber, urethane resin, hard rubber or plastic elastic body.

12. A combination linkage type rubber crawler claimed in claim 11, wherein the crawler body between the burying members is bent and curved so as to become high toward the inner circumference of the crawler body.

13. A combination linkage type rubber crawler claimed in claim 11, wherein the right and left wing portions of the burying member are formed like swept-back wings or are stepped relative to the central part, and a lug is provided at the outer circumferential side of the crawler body at the right and left wing portions.

14. A combination linkage type rubber crawler claimed in claim 11, wherein circumferentially continuous reinforcement layer is buried inside the crawler body.

15. A combination linkage type rubber crawler claimed in claim 10, wherein the crawler body between the burying members is bent and curved so as to become high toward the inner circumference of the crawler body.

16. A combination linkage type rubber crawler claimed in claim 10, wherein the right and left wing portions of the burying member are formed like swept-back wings or are stepped relative to the central part, and a lug is provided at the outer circumferential side of the crawler body are the right and left wing portions.

* * * * *